June 3, 1958     W. J. H. CHANG     2,836,880
FLYING HOT SAW

Filed Oct. 5, 1954     9 Sheets-Sheet 1

INVENTOR.
WILLIAM J.H. CHANG
BY Bosworth, Sessions,
Herrstrom & Williams
ATTORNEYS June 3, 1958 W. J. H. CHANG 2,836,880
FLYING HOT SAW
Filed Oct. 5, 1954 9 Sheets-Sheet 2
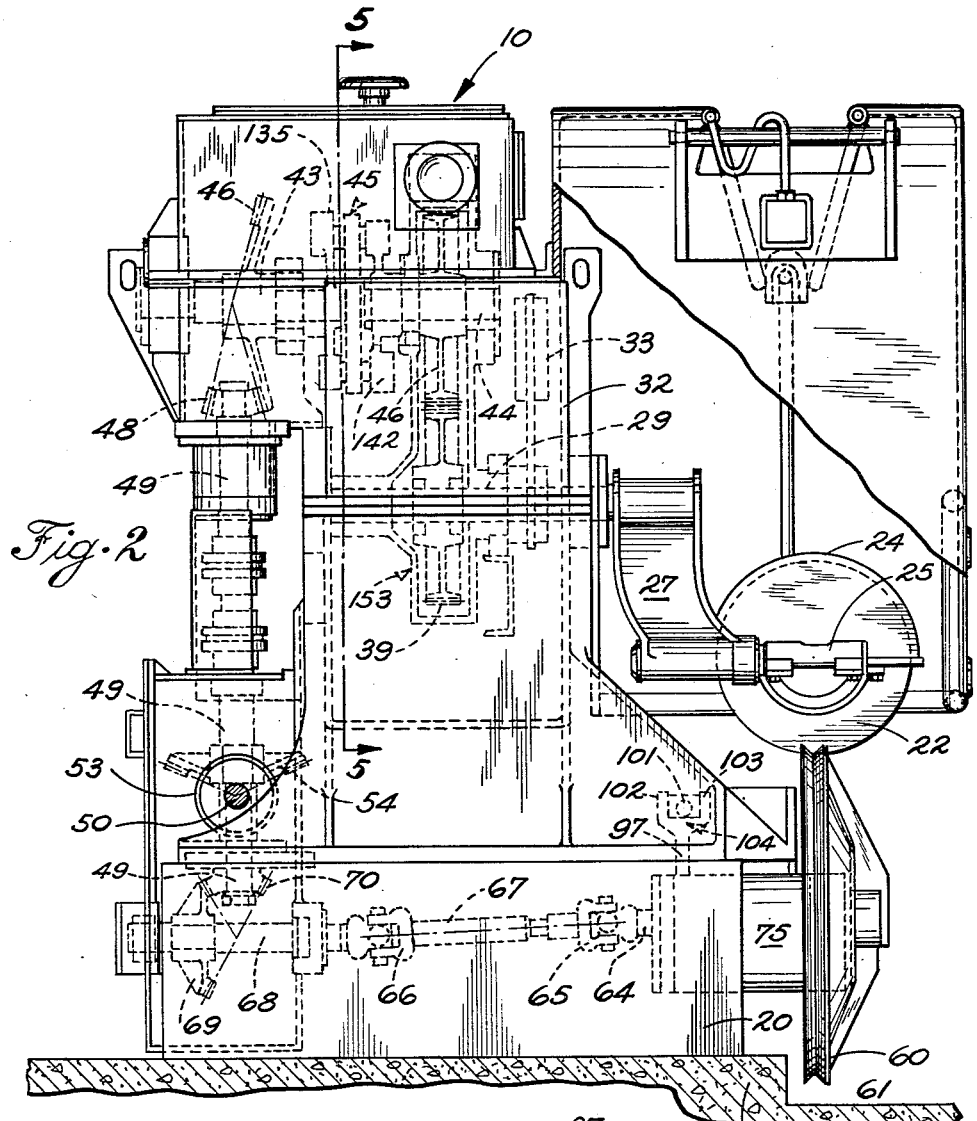
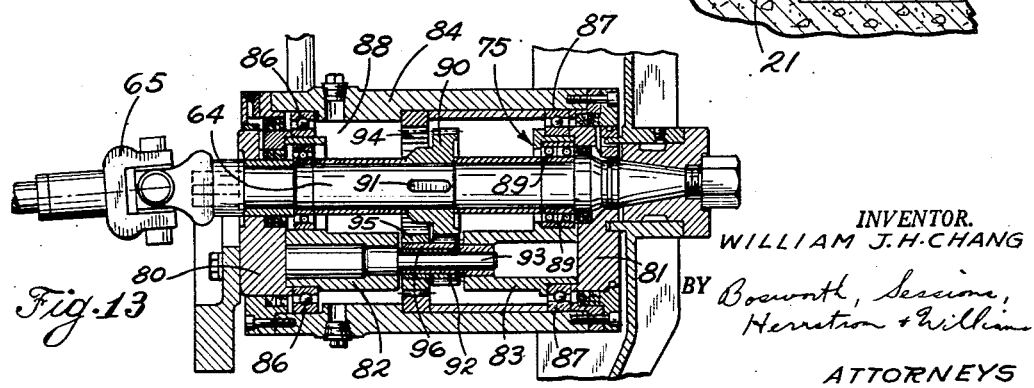
INVENTOR.
WILLIAM J. H. CHANG
BY Boswell, Sessions,
Herretron + Williams
ATTORNEYS

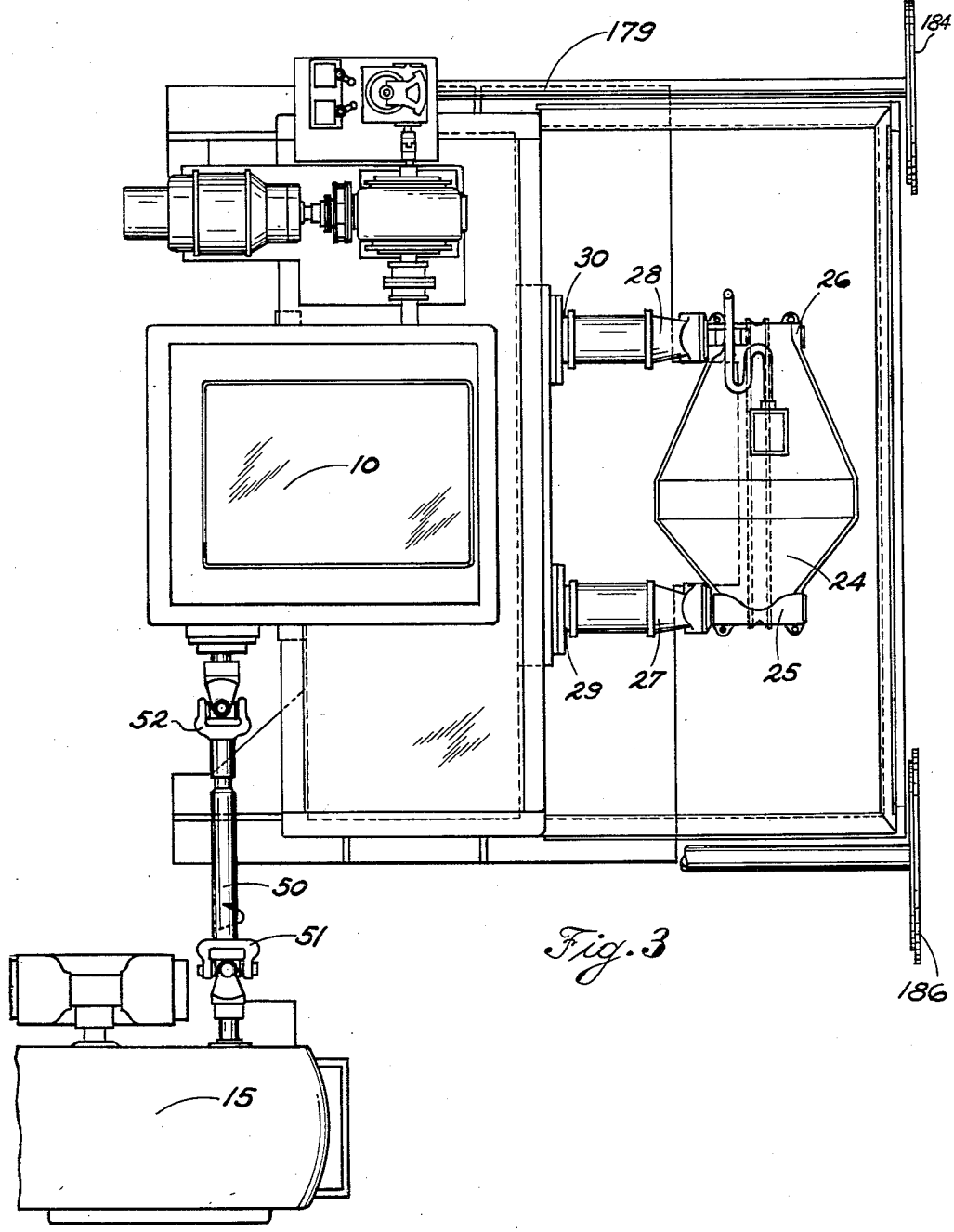

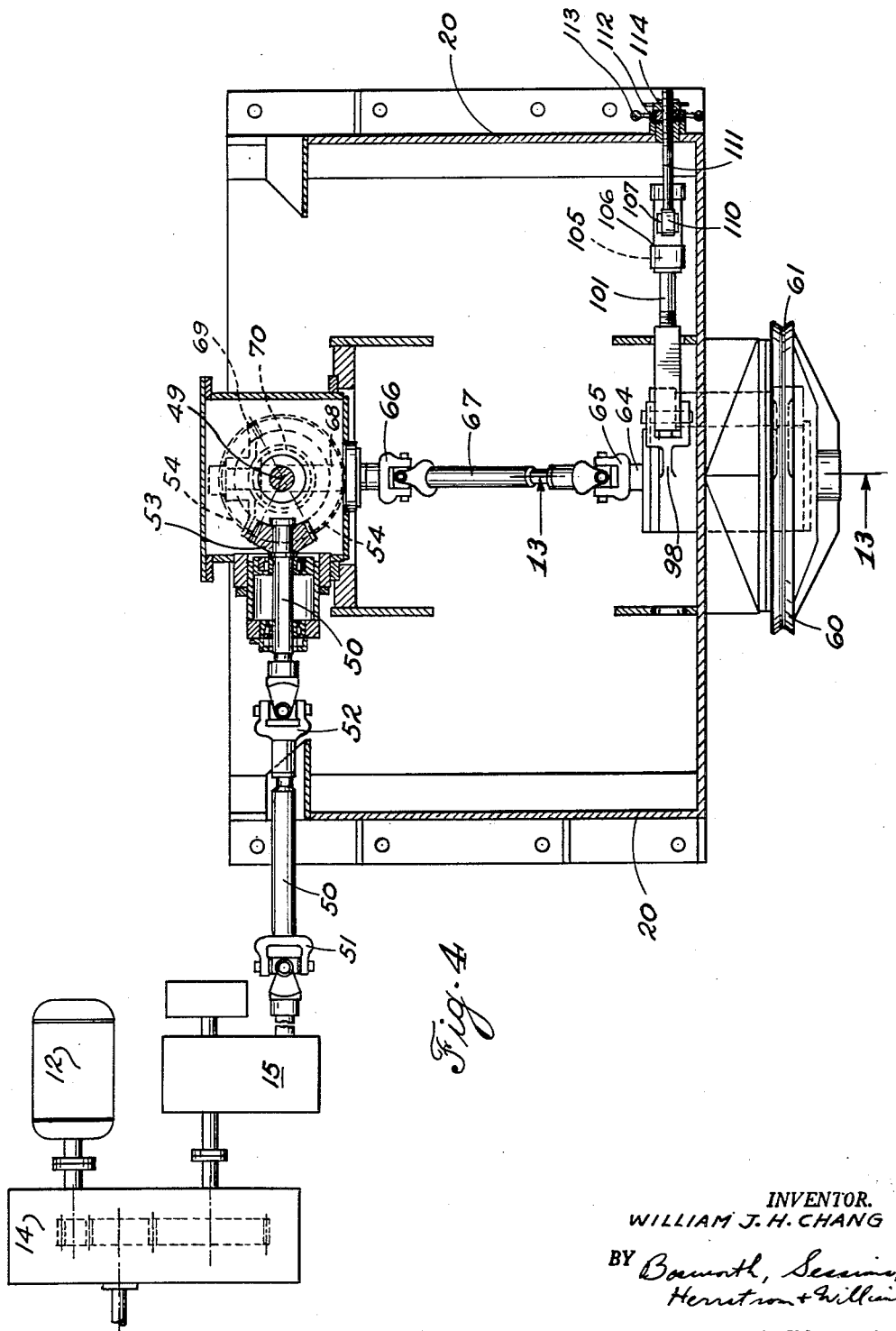

June 3, 1958 W. J. H. CHANG 2,836,880
FLYING HOT SAW
Filed Oct. 5, 1954 9 Sheets-Sheet 5

INVENTOR.
WILLIAM J. H. CHANG
BY Bosworth, Sessions,
Herrstrom + Williams
ATTORNEYS

INVENTOR.
WILLIAM J. H. CHANG

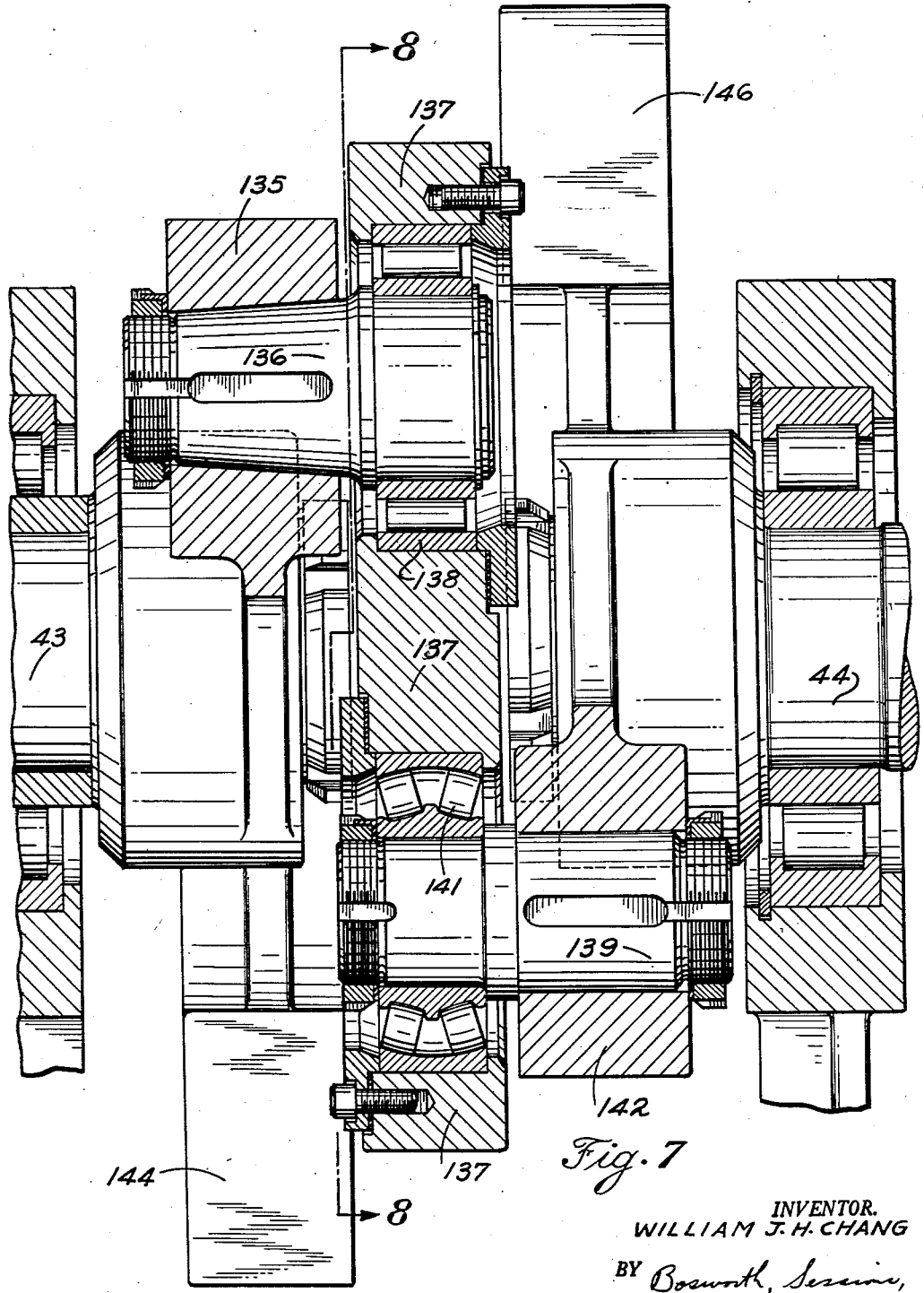

June 3, 1958   W. J. H. CHANG   2,836,880
FLYING HOT SAW
Filed Oct. 5, 1954   9 Sheets-Sheet 8
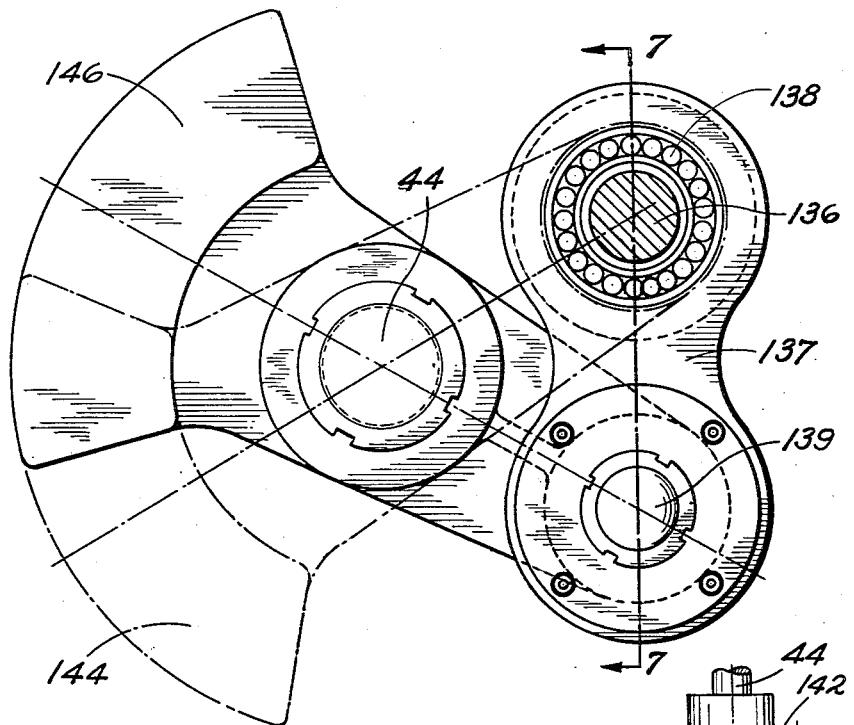
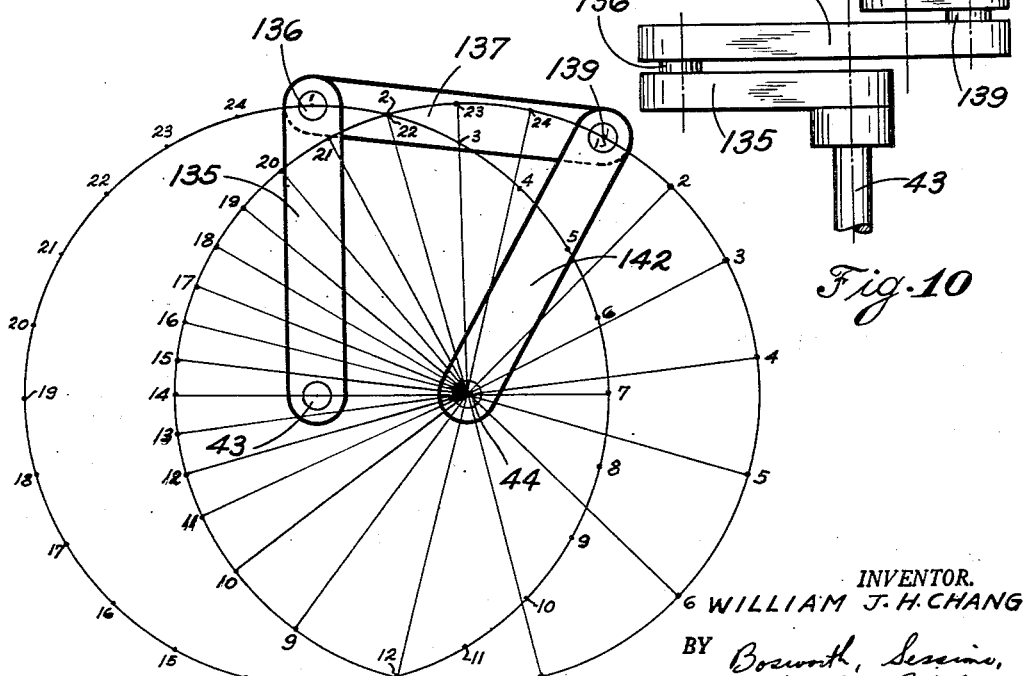
INVENTOR.
WILLIAM J. H. CHANG
BY
ATTORNEYS

INVENTOR.
WILLIAM J. H. CHANG

United States Patent Office 2,836,880
Patented June 3, 1958

2,836,880

FLYING HOT SAW

William J. H. Chang, Youngstown, Ohio, assignor to The Aetna-Standard Engineering Company, Pittsburgh, Pa., a corporation of Ohio Application October 5, 1954, Serial No. 460,393

8 Claims. (Cl. 29—69)

This invention relates to apparatus for cutting off successive lengths from continuously moving stock, and more particularly to flying saws for severing rapidly moving tubing, pipe, rod or the like into accurately cut lengths as the material emerges from a mill. The apparatus described herein is designed particularly for sawing welded pipe into lengths, but it is to be understood that the invention has other uses and applications.

In the manufacture of steel pipe by a well-known process, skelp is heated to welding temperature in a furnace and then passed at high speed through forming and welding rolls in which the skelp is formed into tubular shape and the abutting edges welded together to form the pipe. The skelp is supplied in large coils and the forward end of one coil is welded to the trailing end of the preceding coil before the skelp enters the furnace, thus making it possible to carry on the welding operation for relatively long periods of time without interruption. Since mills of this type operate at high rates of speed, it is necessary to provide some sort of flying cut-off mechanism in order to cut the pipe into lengths as it emerges from the mill at speeds of, for example, as high as one thousand feet per minute.

A flying hot saw or cut off that successfully meets the requirements of mills of this type is disclosed and claimed in the Rodder Patent No. 2,645,001, issued July 14, 1953 and owned by the assignee of the present application. Another and somewhat simpler flying saw that successfully meets the requirements of such mills is disclosed and claimed in the co-pending application of William Rodder Serial No. 302,319, filed August 2, 1952, now Patent No. 2,693,630, issued November 9, 1954, and owned by the assignee of the present application. In the apparatus disclosed in the said patent and co-pending application, a circular saw or other cutting tool is carried by a crank mechanism in a circular path or orbit. Means are provided for guiding the work in a path adjacent but not intersecting the circular path of rotation of the cutting tool, the direction of action of the cutting tool being perpendicular to the path of the work. The cutting tool is carried in its circular path or orbit by mechanism either mechanically or electrically synchronized with the driving mechanism of the mill so that the rotational velocity of the tool is in timed relationship with the lineal velocity of the work. While the work normally follows a path which is adjacent to but does not intersect the circular path of the cutting tool, means are provided for periodically deflecting the work or for periodically moving the circular path of the cutting tool from their normal locations to cause the path of the cutting tool to intersect the path of the work, thereby to sever the stock.

In apparatus of this type the length of the pieces cut by the saw is equal to the speed of the work in feet per minute divided by the number of cuts per minute. Thus, by controlling the rotational velocity of the saw in its orbit and by controlling the frequency with which the saw is caused to intersect the path of the work; i. e., whether a cut is made every one, two, four, or eight revolutions of the saw in its orbit, the saw can be made to cut pipe or various lengths.

It will be evident that the lineal speed of the saw in its travel around its orbit must approximate the lineal speed of the work at the time that the cutting action takes place in order to obtain reasonably square and accurate cuts and to avoid imposition of damaging forces on the saw. The lineal speed of the saw in its orbit is equal to the number of revolutions per minute of the saw times $2\pi r$ where $r$ equals the radius of the orbit of the saw. It will also be evident that for a given radius of orbit the peripheral velocity of the saw most closely approaches the lineal velocity of the work for only one length of cut or for multiples of that length. Thus, if the saw is carried around an orbit having a radius of $10/2\pi$ feet, giving a circumference of 10 feet, then the lineal velocity of the saw in its orbit will very closely approximate the lineal velocity of the work for cuts of 10 feet or multiples thereof. However, when lengths greater or less than multiples of 10 are to be cut the peripheral velocity of the saw will depart from the lineal velocity of the work with the departure increasing as the length of the cut departs from a multiple of 10.

According to prior Patent No. 2,645,001, the radius of the orbit of the saw is made adjustable to make it possible to cut accurately a wide range of lengths. In the saw of application Serial No. 302,319 the radius of the orbit of the saw is fixed and the range of lengths of cut is limited, although a reasonable range of lengths of cuts can be made, particularly with work of a small diameter, because the cut is made so quickly that the difference in the speeds of the saw and of the work does not create serious difficulties.

According to the present invention a wider range of adjustment than possible with the apparatus of application Serial No. 302,319 is obtained and work of greater diameter can be cut more accurately without requiring mechanism for changing the radius of the orbit of the saw. This is accomplished by incorporating in the mechanism for driving the saw in its orbit means for driving the saw at a variable or pulsating rotational speed. Thus the saw can be carried in its orbit at a constant average R. P. M. or average angular velocity, but can be given an instantaneous angular velocity, and hence an instantaneous lineal velocity, greater or less than the said average constant angular velocity at the time of making a cut. If, for example, with a saw having an orbital path ten feet long, it should be desired to cut pipe travelling at 1,000 feet per minute into lengths somewhat greater than 20 feet, then the apparatus would be arranged to make a cut every other revolution and the saw would be rotated at the average R. P. M. required to make the desired length of cut. Since the desired length is greater than 20 feet, the required average angular velocity is less than 100 R. P. M., and the average lineal speed of the saw in its orbit is less than the speed of the pipe.

According to the present invention, however, the instantaneous angular velocity of the saw is increased at the time of making the cut above the average angular velocity required to produce the desired length of cut in order to make the lineal speed of the saw most closely approach the lineal speed of the work.

Similarly, if it were desired to make a cut of less than 20 feet, the instantaneous angular velocity of the saw would be reduced at the time of making the cut below its average angular velocity.

It is, therefore, an object of the present invention to provide a flying hot saw in which the radius of rotation of the saw is fixed and which will more accurately cut a greater range of lengths and thicknesses of work than heretofore possible with a saw having a fixed radius of rotation. Other objects include the provision of a flying hot saw rotatable in an orbit of constant radius at an average constant angular velocity, but in which the instantaneous angular velocity is adjusted to make the lineal speed of the saw in its orbit closely approach the lineal speed of the work during the moment of cutting; the provision of a flying hot saw which is rotatable in an orbit with a pulsating lineal speed in order to substantially synchronize the lineal speed of the saw with the speed of the work at the time of making the cut; the provision of a flying saw mechanism having means for translating constant angular velocity of a drive shaft into pulsating angular velocity of a driven shaft drivingly connected to saw rotating means; the provision of such a flying saw mechanism in which the pulsating means is adjustable the provision of a flying hot saw mechanism having means for rotating the saw about an orbit at a cyclic pulsating velocity; and the provision of a flying hot saw having means to translate a one revolution pulsating cycle of a drive shaft into a two revolution pulsating cycle of the saw rotating means.

Referring now to the drawing,

Figure 2 is a side elevation of the apparatus shown in Figure 1, the view being taken along the line 2—2 of Figure 1.

Figure 3 is a plan view of the apparatus shown in Figure 1.

Figure 4 is horizontal sectional view taken along line 4—4 of Figure 1 and illustrating the main drive mechanism.

Figure 7 is a sectional detail on an enlarged scale of the mechanism for producing the pulsating motion taken along line 7—7 of Figure 5.

Figure 8 is a section at right angles to Figure 7 taken along the line 8—8 of Figure 7.

Figures 9 and 10 are diagrammatic elevational and plan views, respectively, of the pulsating mechanism.

Figure 13 is a fragmentary sectional view on an enlarged scale taken along line 13—13 of Figure 4 showing the eccentric cam lifter in greater detail.

Figure 1:
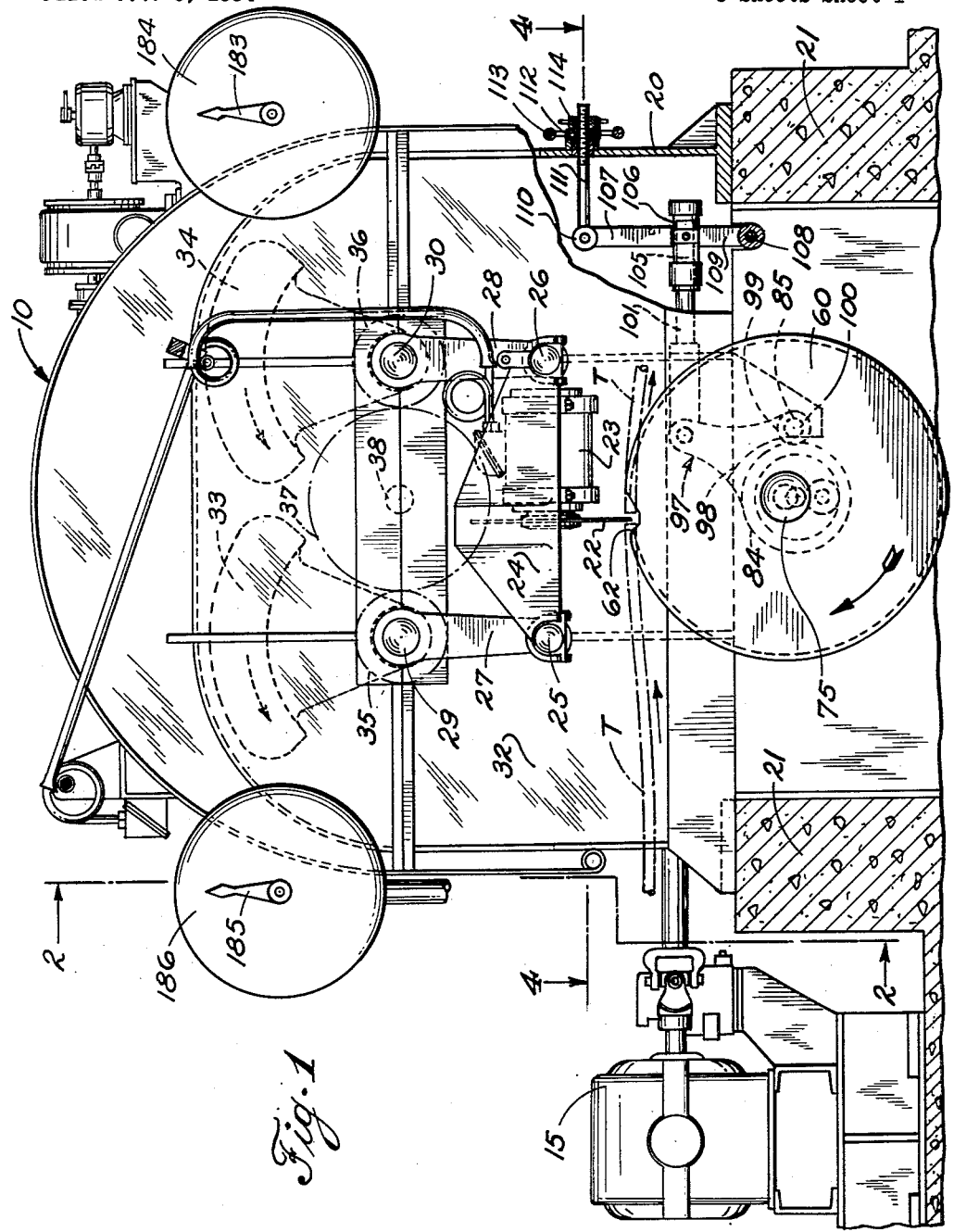
Figure 1 is a front elevation of a preferred form of flying hot saw embodying the invention.

As shown particularly in Figures 1, 2, and 3, a flying hot saw made according to my invention and indicated generally at 10 is adapted to receive tubing or similar material T from a welding mill and to sever it into pieces of the desired length. The mill may be of conventional construction and the motor 12 (see Figure 4) which drives the flying hot saw through appropriate reduction gearing 14 and a P. I. V. (positive infinitely variable drive) 15 is either mechanically or electrically synchronized with the mill drive.

The flying saw 10 (see Figure 1) comprises a suitable frame structure 20 preferably built up of welded steel plates and supported upon a base such as the foundation structure indicated at 21. The frame structure 20 carries the cutting tool which, in the present embodiment, is a circular saw 22. The saw 22 is driven by motor 23, the saw preferably being mounted directly on the motor shaft. The saw and motor are supported in a carriage structure 24 which is preferably constructed and arranged as described in the Rodder Patent No. 2,645,001, issued July 14, 1953 and owned by the assignee of the present application. The carriage structure 24 is mounted upon crank pins 25 and 26 carried by crank arms 27 and 28, respectively, the crank arms being mounted upon crank shafts 29 and 30, respectively.

Crank shafts 29 and 30 (see Figure 5) are supported by suitable bearings in the upwardly extending portion 32 of the frame structure 20. The shafts are provided with counterbalances 33 and 34, respectively, and are driven in synchronism by gears 35 and 36 which are engaged by a centrally disposed drive gear 37 mounted on countershaft 38. Gear 37 in turn is driven by idler pinion 40 carried by stub shaft 41, and pinion 40 is driven by drive gear 42 carried by the horizontally extending driven shaft 44. Shaft 44 (see Figures 2 and 6) in turn is driven by the horizontally extending shaft 43 through a pulsating crank mechanism indicated in general at 45 and to be described hereinbelow.

The drive for shaft 43 (see Figure 6) is through bevel gear 46, pinion 48 and vertical drive shaft 49 which, as shown in Figure 4, is driven from the P. I. V. 15 through drive shaft 50, including universal joints 51 and 52, bevel pinion 53 and gear 54. Thus, through the drive train just described the motor 12 functions to rotate the saw 22 in its orbit at a velocity bearing a definite relationship to the speed of the work delivered by the mill as determined by the P. I. V. 15. The drive is at a substantially uniform angular velocity until the pulsating mechanism 45 is reached which enables the remainder of the drive train to be driven either uniformly with the shaft 43 or to pulsate more or less with respect thereto, as desired.

As noted above, the path of the tube is normally adjacent to but does not intersect the path of the saw (see Figures 1 and 2) and in order to make the paths of the saw and the tube intersect so that the saw can sever the tube, the work is periodically deflected into the path of the saw. This is accomplished by a cam 60 of noncircular shape which has a grooved periphery for guiding the tube as indicated at 61. The cam is notched as at 62 at its highest point so that the saw can sever the tube without cutting the peripheral portion of the cam. The cam 60 is rotated in synchronism with the crank arms 27 and 28 carrying the saw 22 in such manner that the notched high point of the cam coincides with the position of the saw when the saw is in its lowest position. This is accomplished by driving the cam 60 by means of shaft 64 which is driven through universal joints 65 and 66 and the splined shaft section 67 from shaft 68. The drive for shaft 68 is through gear 69 and pinion 70 on vertical shaft 49 which is driven by pinion 53 and gear 54 as aforesaid.

Inasmuch as gear 69 (see Figure 2) has twice as many teeth as pinion 70, shaft 64 carrying cam 60 is driven at half the rotational speed of vertical drive shaft 49. Gear 46 on horizontal shaft 43 has four times as many teeth as pinion 48 at the upper end of shaft 49 so that shaft 43 rotates at one-fourth the speed of shaft 49. Gear 42 drives gear 37 at the same R. P. M. as shaft 43 and gear 37 has twice as many teeth as gears 35 and 36 (see Figure 5) which drive crank shafts 29 and 30. Thus it is evident that crank shafts 29 and 30 are also driven at half the speed of vertical shaft 49 and hence cam 60 is driven at the same R. P. M. as the saw 22 is rotated in its orbit by the cranks 27 and 28.

As in application Serial No. 302,319 the necessity for employing large crank arms is eliminated and a saw which is capable of cutting lengths of pipe within a wide range is provided. By mounting the deflecting cam 60 in such manner that it functions to deflect the work into the path of the saw not for every revolution of the saw in its orbit but only once in every two, four, or more revolutions, long lengths of pipe can be cut with a saw carried on relatively short crank arms which, nevertheless, rotate the saw in its orbit at a lineal speed closely approaching the speed of the tube at the time that the cut is made.

In order to provide for missing cuts of the saw the cam shaft 64 is mounted in an eccentric indicated in general at 75 (see Figures 2 and 13) which rotates at one-half the speed of the cam shaft itself in the preferred embodiment shown in the drawing so that the cam 60 is at its high point and hence capable of deflecting the tube into the path of the saw only once in every two revolutions of the cam saw. It is to be understood that the design of the apparatus can be changed so that the cam can be raised to cutting position not only once in every two revolutions, but also any desired multiple thereof.

In addition, means are provided for raising and lowering the entire eccentric and cam mechanism in timed relationship with the operation of the saw so that a still greater number of revolutions of the saw in its orbit can be permitted without any cutting action taking place.

The eccentric 75 (see Figure 13) for carrying the cam shaft 64 consists of a first end-piece 80, a second end-piece 81, and certain intervening elements, including two bearing supports 82 and 83. Eccentric 75 is mounted within a housing 84 which is supported from a pivot pin 85 (see Figure 1) carried by the frame structure 20. As shown in Figure 13, eccentric 75 rotates within housing 84 on bearings 86 and 87, while shaft 64 is mounted within eccentric 75 on bearings 88 and 89. Shaft 64 carries a drive gear 90 which is keyed as at 91 to the shaft 64. Gear 90 drives an idler pinion 92 supported on a bearing sleeve on a stub shaft 93 which is supported as shown within eccentric 75 by means of the said bearing supports 82 and 83. Positioned for meshing engagement with an internal gear 94 secured to the inner surface of housing 84 is a gear 95 keyed to the hub 96 of idler pinion 92. Rotation of shaft 64 therefore results in rotation of eccentric 75.

In the preferred embodiment of the invention shown in Figures 2 and 13, the relationship between the number of teeth of drive gear 90, pinion 92, gear 95, and internal gear 94 is such that eccentric 75 rotates at one-half the speed of shaft 67 and one-half the speed of cam 60.

With this arrangement the cam 60 is raised by eccentric 75 to a position in which it can lift the pipe or tube into the path of the saw once every other revolution of the cam. Inasmuch as the cam is driven at the same rotational speed as the crank arms 27 and 28, the saw makes a cut every other revolution.

In a preferred form of apparatus, this permits cutting of pipe into lengths of from about 18 to 22 feet with crank arms having a radius of approximately 20 inches.

In order to provide for cutting the pipe into lengths that are multiples of the lengths that can be cut with the saw making a cut every other revolution, means are provided for lowering the housing 84 (see Figure 1) by rotating it downwardly about pivot pin 85 to a position in which the lift of the eccentric is not great enough to enable the cam to raise the tube into the path of the saw. The housing 84 is supported on the pivot pin 85 and the entire housing may be raised or lowered by swinging it about the said pivot pin.

In order to accomplish this rotation of the housing 84 to raise or lower the eccentric 75 and the cam 60, the housing 84 is provided with a projecting bracket-like arm 97 which as seen from the side, as in Figure 1, is shaped like an inverted V. One leg thereof 98 is secured at its lower end to housing 84. The other leg 99 thereof is secured at its lower end to a sleeve 100 which is integral with frame 20 and carries therein pivot pin 85. A connecting rod 101 is pivotally mounted between the two arms 102 and 103 of a yoke 104 (see Figure 2) at the upper end of arm 97 and extends to a piston 105 (see Figure 1) within the hydraulic cylinder 106, cylinder 106 being supported from the frame of the machine by a link 107. The link 107 is pivotally fastened at its lower end 109 to pin 108 which is secured to the frame 20.

It will be evident that when the piston 105 is moved in a direction toward or from the housing 84, the housing will be rotated about pivot pin 85 and hence raised or lowered with respect to the saw. The parts are proportioned so that when the piston 105 is at its extreme position toward the housing 84, the housing is lowered a distance sufficient to prevent the cam 60 from lifting a pipe or tube into the path of the saw. When the eccentric 75 is at its highest position and when the piston 105 is at its extreme position away from the housing, then the housing is raised to normal operating position in which the cam can raise a pipe or tube into proper position to be cut by the saw. Thus, if the piston 105 is held to the right in the embodiment shown, then the saw 22 will cut the pipe once every other revolution. If, however, it is desired to cut longer lengths, hydraulic pressure may be supplied to the cylinder 106 to lower the housing 84, and so long as the housing remains in its lower position, the saw 22 cannot cut the pipe.

In order to raise and lower the housing in timed relation to the rotation of the saw in its orbit, I preferably employ the mechanism described and shown in the said Rodder application Serial No. 302,319, and as particularly shown in Figures 2 and 7 of the Rodder application for controlling the cylinder. Because of the complete disclosure of this mechanism in the aforesaid Rodder application, and because the mechanism per se forms no part of the present invention, it is not disclosed further herein.

In order to adjust the position of the cam 60 for pipes of different diameter and to compensate for wear of the saw 22, the upper end 110 of link 107 is pivotally connected to a threaded link 111 which extends substantially at right angles to link 107. Threaded link 111 engages a nut 112 which is rotatably mounted in the frame 20, is arranged to be rotated by hand wheel 113, and is secured by locking nut 114. By rotating the hand wheel 113 to adjust the position of the threaded link 111, the link 107 can be swung about its pivot pin 108 and the cylinder 106 moved toward or away from the vertical center line of the eccentric housing 84. Thus, with the piston 105 to the right in which position the eccentric housing 84 is raised to cutting position, the height of the cam 60 can be adjusted by means of the hand wheel 113 so that the saw will cut through the pipe or tube but not travel on into the rim of cam 60.

Except for the pulsating crank mechanism indicated in general at 45, the apparatus just described is substantially the same as the saw disclosed in the said Rodder application Serial No. 302,319.

Figure 5:
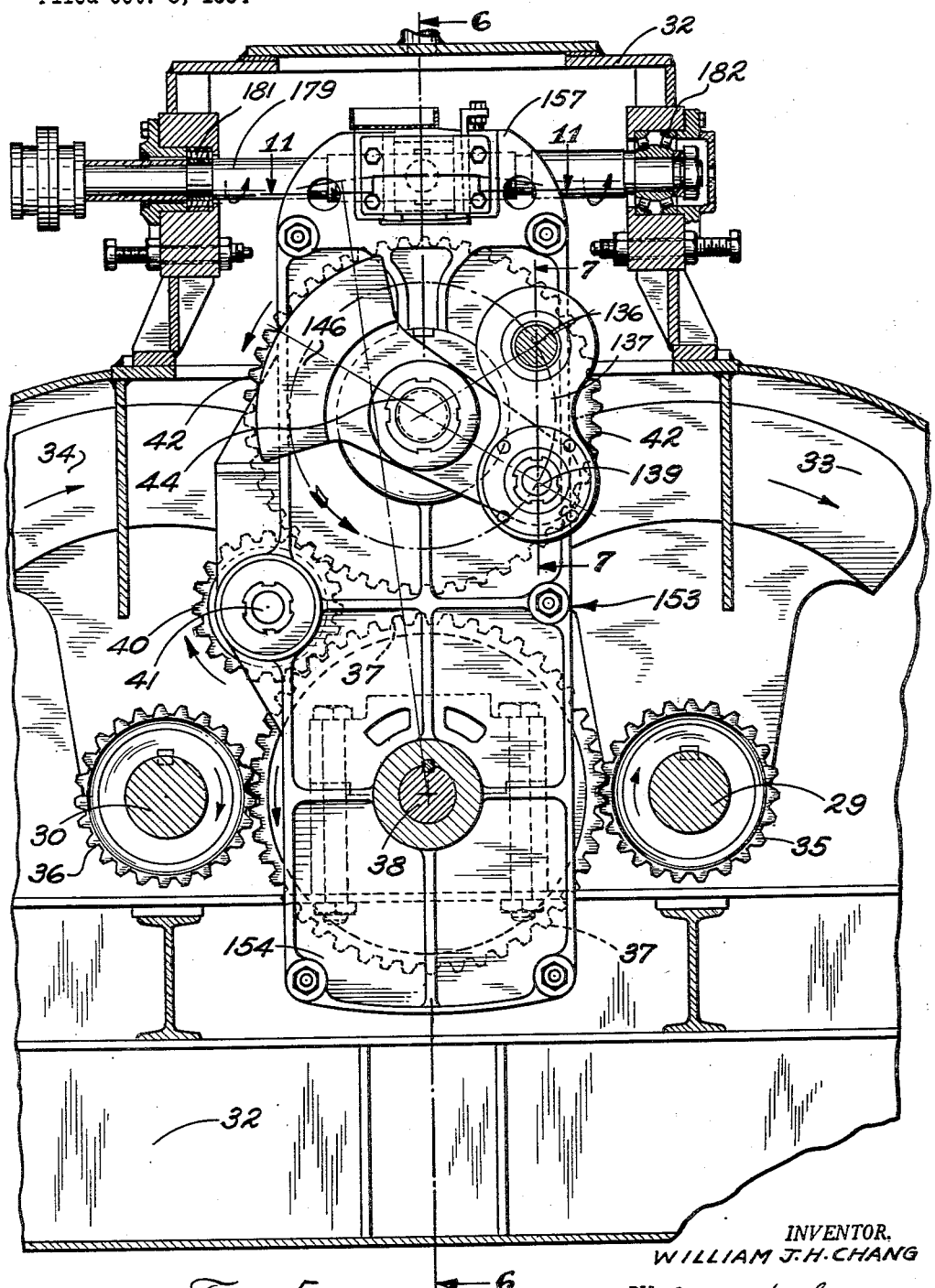
Figure 5 is a vertical sectional view taken approximately as indicated by line 5—5 of Figure 2 and illustrating the mechanism for imparting the pulsating angular movement to the saw in its orbit.
Figure 6:
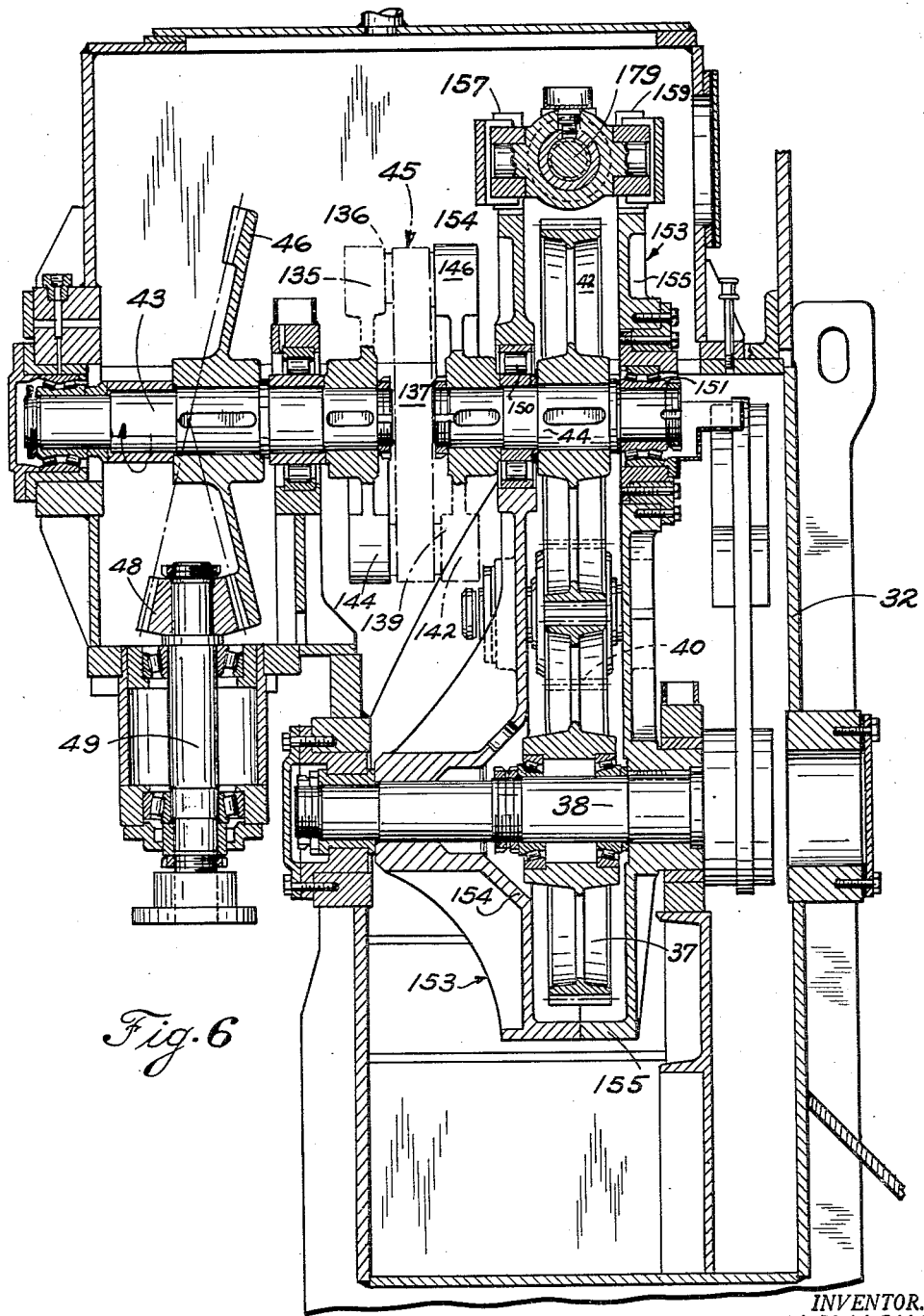
Figure 6 is a vertical sectional view taken along the line 6—6 of Figure 5.

In order to provide for improved operation of saws such as described hereinabove in which the radii of the crank arms are fixed, and in order to provide for accurate cutting of a wider range of thickness of stock, pipe diameters, and the like as well as a wider range of lengths than is possible with the aforesaid apparatus, the crank mechanism indicated in general at 45 in Figures 5, 6, and 7 is interposed in the drive train to give a pulsating motion to the crank arms 27 and 28 and to the saw in its orbit, thus enabling the lineal speed of the saw at the time that the cut is made to approximate more nearly the lineal speed of the work.

To this end the horizontal drive shaft 43 (see Figures 6 and 7) which is driven at substantially uniform angular velocity by the drive mechanism previously described is provided with a crank arm 135 carrying a crank pin 136 on which a rigid connecting link 137 is mounted with an appropriate anti-friction bearing 138. The other end of link 137 is mounted upon crank pin 139 by anti-friction bearings 141. Crank pin 139 is carried by crank arm 142 which is the same length as crank arm 135 and which is mounted on driven shaft 44. Crank arm 135 is provided with a counterweight 144 and crank arm 142 is provided with a counterweight 146.

It will be evident that, with this mechanism, so long as the axis of shaft 44 coincides with the axis of shaft 43, shaft 44 will be driven at precisely the same angular velocity as shaft 43, the unit 45 acting the same as a rigid coupling. However, if the axis of shaft 44 is displaced from the axis of shaft 43 as shown diagrammatically in Figures 9 and 10, then with shaft 43 rotating at a constant angular velocity shaft 44 will have a pulsating or varying angular velocity imparted to it because of the change in the angular relationships between the connecting link 137 and the cranks 135 and 142. The unequal angular displacement of crank arm 142 for equal angular displacement of crank arm 135 when the axes of shafts 43 and 44 are separated is shown by the numbered points in Figure 9.

The average angular velocity of shaft 44 is the same as shaft 43 in that shaft 44 necessarily makes the same number of complete revolutions in a minute as shaft 43. However, during any given revolution of shaft 44 its angular velocity varies from an instantaneous velocity equal to the velocity of shaft 43 up to a maximum, then back through the equal velocity to a minimum, and finally, back again to the velocity equal to the velocity of shaft 43. As a result of this action the velocity of the cranks and the saw at the time the cut takes place can be increased as compared to the average angular velocity by displacing the shaft 44 in one direction from the shaft 43 and can be decreased by displacing the axis of the shaft 44 in the opposite direction from the axis of the shaft 43. The amount by which the instantaneous velocity of the shaft 44 departs from the constant velocity of shaft 43 varies with the amount of displacement in either direction.

Figure 12:
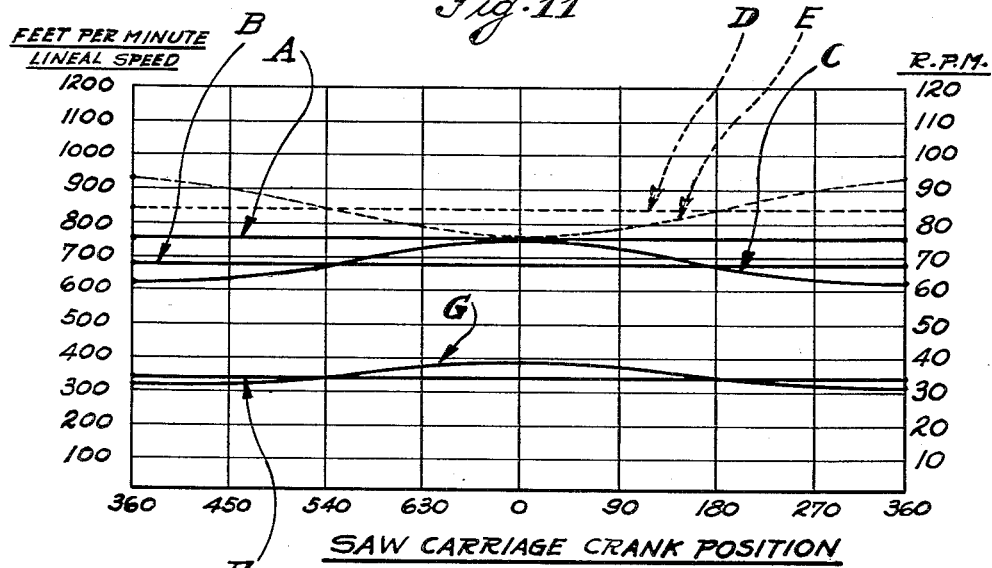
Figure 12 is a diagrammatic view showing the effect of the adjustment of the pulsating mechanism on the instantaneous lineal or tangential speed of the saw in its orbit.

Inasmuch as the saw makes two revolutions in its orbit for each revolution of the gear 42 and shaft 44 in the embodiment of the invention shown in the drawings, the angular velocity of the saw in its orbit goes through a complete cycle of speed variation once every two revolutions as compared to a cycle of speed variation in every revolution of the gear 42 and shaft 44. This is shown diagrammatically in Figure 12 of the drawings in which the peripheral and angular speeds of the saw 22 and the angular speed of shaft 44 are plotted (without attempting to make the curves precise) against the angular position of the saw during two complete revolutions of the saw. In this figure the zero position of the saw 22 is the position shown in Figure 1 of the drawings with the saw at the lowest point in its orbit. The cut is made as the saw approaches this point and accordingly it is in this region that it is desirable to synchronize the speed of the work and the lineal speed of the saw as closely as possible.

In order to cut 20 foot lengths of pipe with the pipe moving at 750 feet per minute, it is necessary to make 37.5 cuts per minute. With the saw arranged to cut every other revolution this means that the cranks must carry the saw in its orbit at 75 R. P. M. Assuming, for the sake of convenience in calculation, that the crank radius is such that the circumference of the circular orbit of the saw is 10 feet, then the tangential or lineal speed of the saw at 75 R. P. M. will be 750 feet per minute. Thus, in the chart the straight line A can be considered to represent the constant 75 R. P. M. rotational speed of the saw, the constant 750 feet per minute lineal speed of the saw, and the constant 750 feet per minute speed of the pipe. The constant speed of the saw is obtained by adjusting the pulsating device 45 to central position, with the axes of shafts 43 and 44 in alignment. At the zero degree position the instantaneous speed of the saw in a direction parallel to the travel of the pipe is 750 feet per minute, precisely the same as the speed of the pipe.

If, however, it is desired to cut pipe to any lengths other than 20 feet, then the average lineal speed of the saw will depart from the speed of the work. For example, if it should be desired to cut the pipe into 22 foot lengths, then the saw must make 750/22 or 34.1 cuts per minute requiring the saw to be carried around its orbit at the average rate of 68.2 R. P. M. Since the length of the orbit is 10 feet, the average lineal speed of the saw is only 682 feet per minute as compared with the 750 feet per minute of the work. This speed is indicated by the straight line B which represents the average R. P. M. of the carriage and the average lineal speed of the saw for a 22 foot cut length. However, by adjusting the shaft 44 so that it is offset from the shaft 44, a pulsating angular velocity can be given to the cranks and a corresponding lineal speed to the saw. As shown by curve C, with such an adjustment, the instantaneous lineal speed of the saw and the instantaneous angular velocity of the cranks varies from a minimum in a position 360° away from the cutting position to a maximum at the cutting position where the lineal speed as shown by the curve coincides with the 750 feet per minute pipe speed; then the speed is reduced to the minimum 360° after the cutting position. Thus, in each two revolutions of the saw in its orbit, the angular speed and the lineal speed of the saw varies from a minimum to a maximum at the time the cut is to be made and then back to the minimum again.

In order to cut lengths of pipe shorter than 20 feet the adjustment must be made in the opposite direction. For example, if it is desired to cut the pipe into 18 foot lengths then 750/18 or 41.66 cuts per minute are required, which means that the saw must be carried around in its orbit at the rate of 83.33 R. P. M. At this rate, as shown by the broken line D the lineal speed of the saw averages 833 feet per minute as compared with the 750 per minute pipe speed. However, by means of the crank mechanism 45, with the shaft 44 displaced from shaft 43 in the opposite direction from the previous adjustment, the instantaneous speed at the time that the cut is made can be reduced to 750 feet per minute, as shown by the curve E. In curve E the instantaneous R. P. M. of the carriage and the instantaneous tangential speed of the saw vary from a maximum 360° away from the cutting position to a minimum of 750 feet per minute and 75 R. P. M. at the cutting position and back to a maximum of about 92 R. P. M. or 920 feet per minute at 360° from the cutting position.

Straight line F represents the constant angular velocity of 34.1 R. P. M. of driving shaft 43 (Figure 6) required to drive the saw 22 at the 68.2 revolutions per minute necessary to make 22 foot lengths of cut. Curve G represents the pulsating velocity of shaft 44 required to impart the pulsating motion to saw 22 shown by curve C. The angular velocity of saw 22 (curve C) is twice the angular velocity of driven shaft 44 (curve G); the angular velocity of shaft 44 reaches a maximum and a minimum once every revolution of the shaft, but because of the gearing between shaft 43 and the crank shafts 29 and 30 the saw 22 reaches its maximum and minimum velocity once every two revolutions.

Thus, by means of the pulsating mechanism 45 the lineal speed of the saw at the time of making the cut can be made to approach closely the lineal speed of the pipe throughout a relatively wide range of lengths of cut. In the embodiment of the invention shown in the drawings this range goes from 18 foot to 22 foot lengths of cut and all intermediate lengths therebetween and the accurate synchronization of speeds throughout the range permits the cutting of pipe of much greater diameter than heretofore possible with saws not instantaneously synchronized with the speed of the work. The cutting range possible is greater than 18 to 22 feet, particularly with small pipe, because the cut is made so quickly that it is not necessary to have the speed of the saw and the speed of the work synchronized precisely.

In the example given above, for the sake of simplicity, the cut has been considered as taking place at the 0° position of the saw carriage (see curve C, Figure 12) and the length of the orbit of the saw has been taken as 10 feet. In the saw as constructed, the cut necessarily takes place as the saw is approaching the 0° position and is completed by the time the 0° position is reached. Therefore, since a tangent to the orbital path of the saw at the time that the saw starts to make its cut is not parallel to the axis of the work, it is desirable to have the tangential speed of the saw slightly in excess of the speed of the work to compensate for the angularity between the direction of travel of the saw in its orbit and the direction of travel of the work. As a practical matter it has been found that saws in which the crank radius is 20 inches, giving a circumference of about 10.46 feet, operate very satisfactorily.

The pulsating crank mechanism 45 can be adjusted during operation of the saw to give the most accurate cut, the precise adjustment depending not only upon the length of cut desired but also upon the diameter of the tubing or pipe being cut, the diameter of the saw blade and the adjustment of the position of the eccentric. All of these factors enter into the determination of the point at which the saw begins to cut the work.

In order to make it possible to adjust the pulsating mechanism 45 while the saw is in operation, the bearings 150 and 151 (see Figures 5 and 6) for the driven shaft 44 and drive gear 42 are mounted in an adjustment housing indicated in general at 153 and made up of a rear portion 154 and a front portion 155. Portions 154 and 155 join on the center line, as seen in Figure 6, of the drive gear train made up of gears 37, 40 and 42 and the entire housing 153 is pivoted on countershaft 38. Housing 153 also supports shaft 41 which carries idler pinion 40. Thus, housing 153 can be rocked about the axis of shaft 38 without changing the relation between gears 37, 40 and 42, or between gears 35, 36 and 37. This rocking movement shifts the axis of driven shaft 44 with respect to the axis of drive shaft 43 and thus adjusts the pulsating crank mechanism 45 and controls the pulsation of the driven shaft 44 as previously described.

Figure 11:
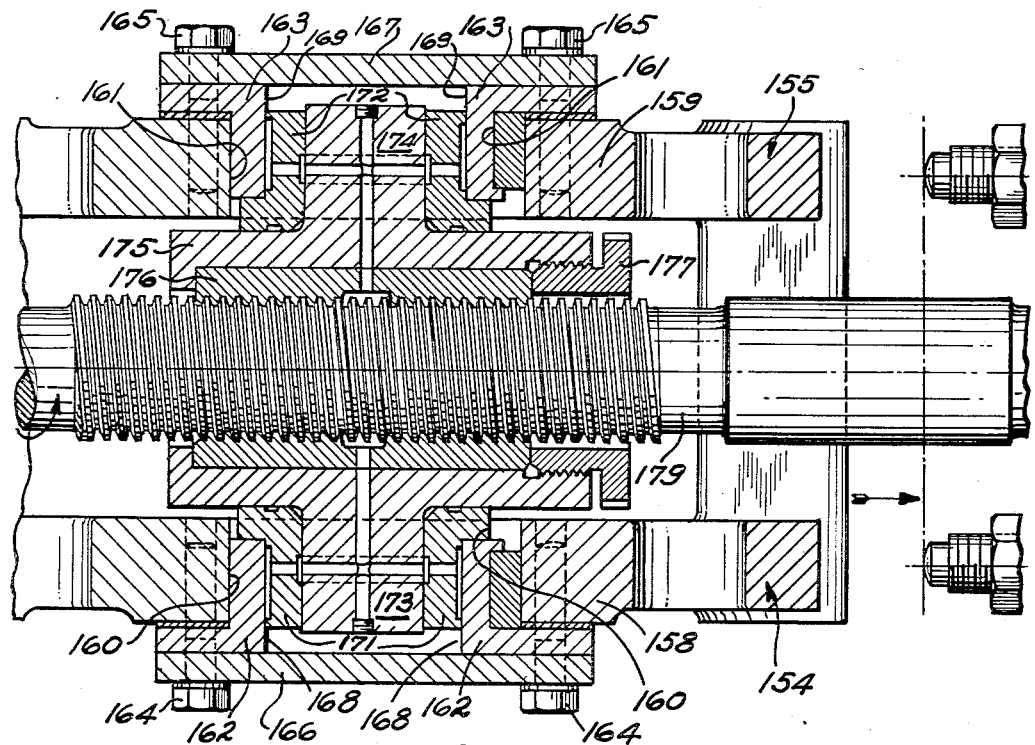
Figure 11 is a sectional view on an enlarged scale taken along line 11—11 of Figure 5 and showing the adjusting mechanism for the pulsating mechanism.

In order to provide for positive and accurate adjustment of the position of the housing 153 and corresponding adjustment of the position of driven shaft 44 with respect to the drive shaft 43, the housing is projected upwardly beyond shaft 43 as indicated at 157 and as shown particularly in Figures 5, 6 and 11. The upper portions 158 and 159 (see Figure 11) of housing portions 154 and 155 are provided with openings 160 and 161, respectively, to receive bearing members 162 and 163 which are held in place by bolts 164 and 165 and enclosed by cover plates 166 and 167. Bearing members 162 and 163 provide vertical sliding ways 168 and 169 which slidably support bearing blocks 171 and 172.

Bearing blocks 171 and 172 in turn carry trunnions 173 and 174 by means of which the nut housing 175 is mounted for rocking movement as well as for vertical displacement with respect to the adjustment housing 153, by reason of the slidable engagement of the bearing blocks 171 and 172 within the members 162 and 163.

Nut housing 175 carries a threaded nut 176 within it, the nut being held in place by a retaining nut 177 threaded into the end of the housing. Nut 176 engages a threaded adjusting screw 179 which is supported by appropriate bearings 181 and 182 (see Figure 5) carried by the upper portion of the frame 32. It will be evident that with this arrangement rotation of shaft 179 results in rocking movement of the adjustment housing 153 about the shaft 38 and relative movement between the driven shaft 44 and the drive shaft 43 of the pulsating mechanism.

Preferably, for convenience of operation, shaft 179 (see Figure 5) is driven by an electric motor with appropriate push-button controls (not shown) and the shaft is connected by appropriate gearing to the indicator 183 mounted on the face of the crank adjustment dial 184 (see Figure 1). The indicator 183 gives the position of the crank adjustment mechanism and is preferably calibrated in terms of length of cut so that in starting up the machine to cut pipe of a given length the operator can adjust the P. I. V. 15 to its desired ratio between the revolutions per minute of the saw and the speed of the work in feet per minute, this adjustment being indicated by the indicator 185 and the dial 186. The operator then adjusts the pulsating crank mechanism 45 to the proper position to give the correct speed of the saw at the time of the cut, using the indicator 183. After the saw has been started, final adjustments of both the speed and the pulsating mechanism can be made while the saw is in operation to bring the lineal speed of the saw as close as possible to the speed of the work at the time the cut takes place and to make the length of cut as accurate as possible. Fnal adjustments of the pulsating mechanism are made by observing the action of the saw as it cuts the work and by observing the squareness of the cut ends of the work.

It is to be understood that the form of this invention herewith shown and described is to be taken as a preferred example of same. The scope of the invention is defined in the appended claims.

I claim:

1. Apparatus for severing successive longitudinal sections from continuously moving elongated work such as pipe, tube, rod and the like comprising a motor driven rotary cutting tool, guides for directing the work in a normal path, a rotatable support for said cutting tool adapted to carry said tool in an orbital path approaching but not intersecting the normal path of the work, means for periodically causing the paths of the work and the cutting tool to intersect, means for driving said rotatable support at an average R. P. M. so related to the speed of the work as to cause the tool to cut the work into pieces of the desired length when the paths of said tool and said work are caused to intersect, said driving means having a single source of power, a drive train connecting said source of power to said rotatable support, and means incorporated in said drive train for varying the instantaneous angular velocity of said support and the instantaneous lineal speed of the cutting tool in its orbit without changing said average R. P. M. of said support, whereby the lineal speed of said cutting tool in its orbit can be made substantially equal to the lineal speed of said work at the time said paths of said work and said cutting tool are caused to intersect, and means for adjusting said varying means while the apparatus is in operation.

2. Apparatus for severing successive longitudinal sections from continuously moving elongated work such as pipe, tube, rod and the like comprising a motor driven circular saw, a rotatable support for said circular saw adapted to carry said saw in a circular path, means for driving said rotatable support at an average R. P. M. functional of the speed of the work, said driving means including a single source of power, a drive train connecting said source of power to said rotatable support, and adjustable means incorporated in said drive train for varying the instantaneous angular velocity of said support and correspondingly the instantaneous lineal speed of the saw in its orbit without changing the average R. P. M. of said support, said adjustable means comprising a driving shaft and a driven shaft, a crank on said driving shaft, a crank on said driven shaft, a rigid link connecting said cranks, and means for adjusting the relative position of said driving and driven shafts while the apparatus is in operation.

3. Apparatus for severing successive longitudinal sections from continuously moving elongated work such as pipe, tube, rod and the like comprising a motor driven circular saw, guides for directing the work in a normal path, a rotatable support for said circular saw adapted to carry said saw in a circular path approaching but not intersecting the normal path of the work, means driven in timed relation with said rotary support for periodically causing the path of the work and the saw to intersect once in a predetermined even number of revolutions of said support, means for driving said rotatable support at an average R. P. M. functional of the speed of the work, said driving means including adjustable pulsating means for varying the instantaneous angular velocity of said support and correspondingly the instantaneous lineal speed of the saw in its orbit at the time the paths of the work and the saw are caused to intersect without changing the average R. P. M. of said support, said adjustable pulsating means comprising a driving shaft and a driven shaft rotating at half the speed of the rotatable support and adjustable crank means connecting said driving and driven shafts and adapted to cause said driven shaft to go through a complete cycle of pulsation in each revolution thereof, whereby said rotary support goes through a corresponding complete cycle in two revolutions.

4. Apparatus for severing successive longitudinal sections from continuously moving elongated work such as pipe, tube, rod and the like comprising a motor driven circular saw, a rotatable support for said circular saw comprising a pair of crank arms adapted to carry said saw in a circular path approaching but not intersecting the normal path of the work, crank shafts for said crank arms, means for driving said crank arms comprising a drive shaft adapted to be driven at a constant rotational speed functional of the speed of the work, a driven shaft having an axis parallel to the axis of said drive shaft adjustable means interposed between said drive shaft and said driven shaft for varying the instantaneous angular velocity of said driven shaft without changing the average R. P. M. thereof, a gear train driven by said driven shaft for rotating said crank shafts, said gear train including a gear mounted on said driven shaft, a gear mounted on a counter-shaft spaced from said driven shaft, an idler gear interposed between said gear on said driven shaft and said gear on said counter-shaft and a pinion mounted on each of said crank shafts and driven by said gear on said counter-shaft, and adjustable means for varying the instantaneous angular velocity of said crank arms comprising a crank on said driving shaft, a crank on said driven shaft and a rigid link connecting said cranks, a housing pivotally supported by said counter-shaft and carrying said idler gear and said driven shaft and means for moving said housing about the axis of said counter-shaft, whereby the axis of said driven shaft can be moved with respect to the axis of said driving shaft, thereby adjusting said adjustable means.

5. Apparatus according to claim 4 having means for guiding the work in a normal path approaching but not intersecting the normal path of the work and means for causing the paths of the work and the saw to intersect once in a predetermined even number of revolutions of said support, and wherein the gear train between said driven shaft and said support drives said support at twice the speed of said driven shaft.

6. Apparatus for severing successive longitudinal sections from continuously moving elongated work such as pipe, tube, rod and the like comprising a motor driven circular saw, guides for directing the work in a normal path, a rotatable support for said circular saw comprising a pair of crank arms adapted to carry said saw in a circular path approaching but not intersecting the normal path of the work, crank shafts for said crank arms, means for driving said crank arms comprising a drive shaft driven at a constant rotational speed functional of the speed of the work, a driven shaft, adjustable means interposed between said drive shaft and said driven shaft for varying the instantaneous angular velocity of said driven shaft without changing the average R. P. M. thereof, a power train driven by said driven shaft for rotating said cranks, said power train including a counter-shaft spaced from said driven shaft and driven thereby, and means for driving said crank shafts from said counter-shaft, said adjustable means for varying the instantaneous angular velocity of said crank arms comprising a crank on said driving shaft, a crank on said driven shaft and a rigid link connecting said cranks, a housing pivotally supported by said counter-shaft and carrying said driven shaft, and means for moving said housing about the axis of said counter-shaft, whereby the axis of said driven shaft can be moved with respect to the axis of said driving shaft thereby adjusting said adjustable means.

7. Apparatus for severing successive longitudinal sections from continuously moving elongated work such as pipe, tube, rod and the like comprising a motor driven rotary cutting tool, guides for directing the work in a normal path, a rotatable support for said cutting tool adapted to carry said tool in a circular orbital path approaching but not intersecting the normal path of the work, means for periodically causing the paths of the work and the cutting tool to intersect, a single source of power for driving said rotatable support at an average R. P. M. functional of the speed of the work, a drive train connecting said source of power to said rotatable support, and adjustable means incorporated in said drive train for increasing during one portion of the cycle and decreasing during another portion of the cycle the instantaneous angular velocity of said support and the instantaneous lineal speed of the cutting tool in its orbit without changing the average R. P. M. of said support or the path of the cutting tool, whereby the lineal speed of said cutting tool in its orbit can be made substantially equal to the lineal speed of said work at the time said paths of said work and said cutting tool are caused to intersect.

8. Apparatus for severing successive longitudinal sections from continuously moving elongated work such as pipe, tube, rod and the like comprising a motor driven circular saw, a rotatable support for said circular saw adapted to carry said saw in a circular path, means for driving said rotatable support at an average R. P. M. functional of the speed of the work, said drive means having a single source of power, a drive train connecting said source of power to said rotatable support, and adjustable means incorporated in said drive train for increasing during one portion of the cycle and decreasing during another portion of the cycle the instantaneous angular velocity of said support and correspondingly the instantaneous lineal speed of the saw in its orbit without changing the average R. P. M. of said support.

References Cited in the file of this patent

UNITED STATES PATENTS

| 2,332,013 | Rudert et al. | Oct. 19, 1943 |
| 2,416,573 | Finch | Feb. 25, 1947 |
| 2,645,001 | Rodder | July 14, 1953 |
| 2,709,846 | Severin | June 7, 1955 |